UNITED STATES PATENT OFFICE.

CHARLES McLEAN, OF BOSTON, MASSACHUSETTS, ASSIGNOR TO HIMSELF T. C. HARGRAVES, AND CHARLES MITCHELL.

IMPROVED MAPLE-FLAVORED SUGAR AND SIRUP.

Specification forming part of Letters Patent No. 56,673, dated July 24, 1866.

*To all whom it may concern:*

Be it known that I, CHARLES McLEAN, of Scotland, residing at Boston, in the county of Suffolk and State of Massachusetts, have invented an Improved Maple-Flavored Saccharine Matter; and I do hereby declare that the following is a description of my invention sufficient to enable those skilled in the art to practice it.

The saccharine matter which is the product of the maple tree is, in either a fluid or solid form, and for many purposes, very agreeable to the taste of most persons, and commands a higher price in the market than some other saccharine matters of equal grade; but the natural supply of maple sirup and sugar from the sap of the maple tree is limited in amount.

To change or modify the flavor of cane or other sugars or sirups so as to give to them the true maple flavor, and without the mixture therewith of any deleterious matter, is the object of my invention, which is based upon my discovery that an extract can be made from maple wood which will give to cane and other sugars and sirups the flavor possessed by the natural maple sugar and sirup.

In making the maple-flavoring extract I prefer to make use of green sugar-maple wood divested of its bark, (though the dry wood and other varieties of maple may be used instead.) This I reduce by grinding or otherwise into small particles, and then boil the finely-subdivided wood.

I prefer for the purpose of boiling to make use of a closed boiler and to convey the steam generated through a pipe which is artificially cooled for the purpose of condensing the steam. The liquid of condensation will be found quite disagreeable to the taste, and I am of opinion that the extract is benefited by its removal, as described.

The water remaining in the boiler contains the extract desired, and the wood may be removed by a simple straining process, after which the damp solid matter may be subjected to pressure to express the remaining fluid extract and to partially dry the wood, which can, when nearly or fully dried, be used for fuel.

It is advisable to make the extract strong, so that it will be less bulky in transportation, and so that it will not reduce to an inconvenient degree the density of the sirups to which it is to be added.

The proportion of the extract to be added to any given quantity of sirups will depend not alone on the strength of the extract, but on the taste of the consumer or mixer.

Branches cut from the trees of maple orchards, young wood from the promiscuous growth of forests, and maple wood generally, obtained where, from a variety of circumstances, it is not feasible or profitable to make saccharine matter from maple-sap, may be used in the practice of my invention.

I claim—

The within-described new manufacture.

CHARLES McLEAN.

Witnesses:
    J. B. CROSBY,
    FRANCIS GOULD.